Oct. 13, 1970 J. B. SPELLER 3,534,194
LOW NOISE ELECTRICAL CONTACT APPARATUS
Filed March 6, 1968 4 Sheets-Sheet 1
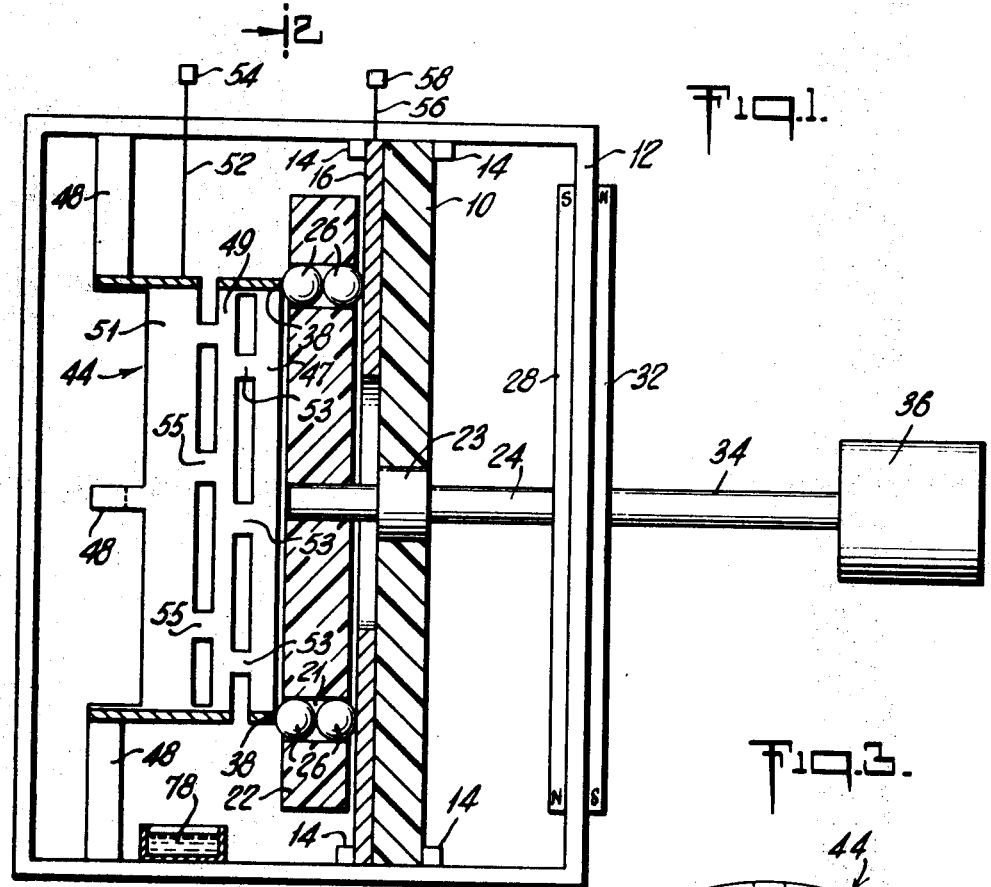
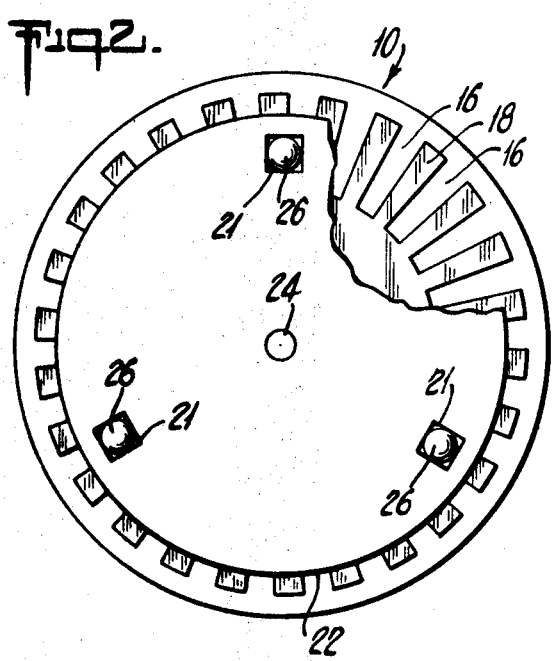
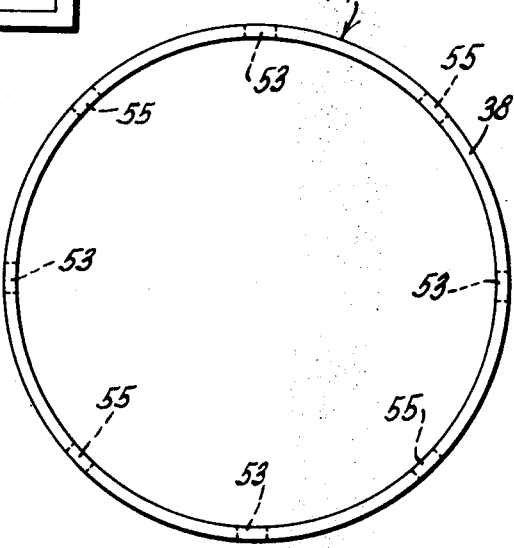
INVENTOR
JACK B. SPELLER
BY
ATTORNEY

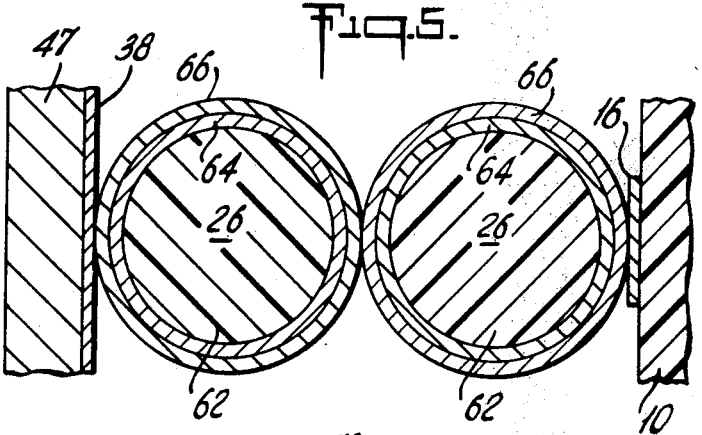
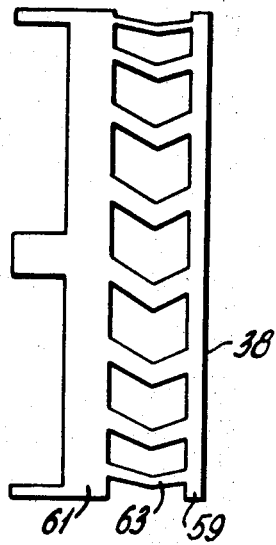
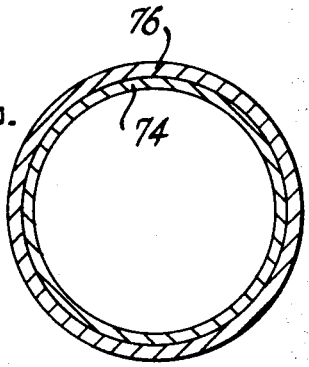
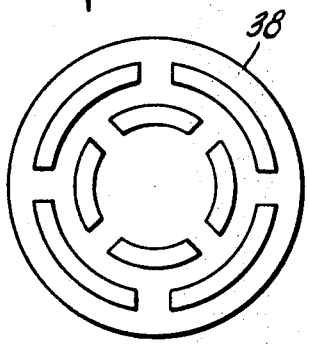
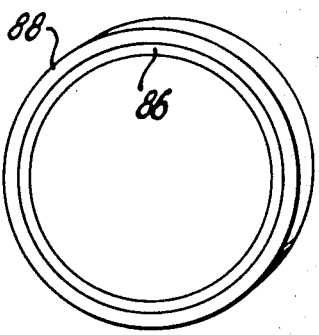
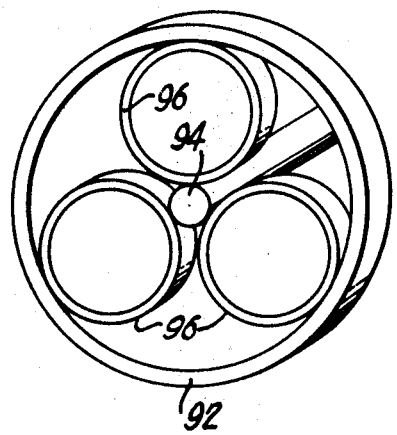

Oct. 13, 1970  J. B. SPELLER  3,534,194
LOW NOISE ELECTRICAL CONTACT APPARATUS
Filed March 6, 1968  4 Sheets-Sheet 3
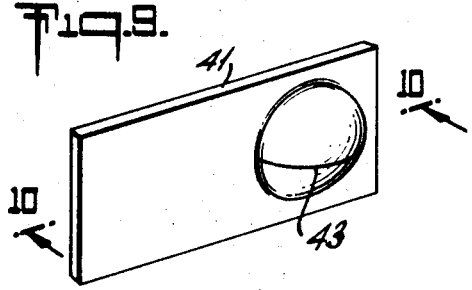
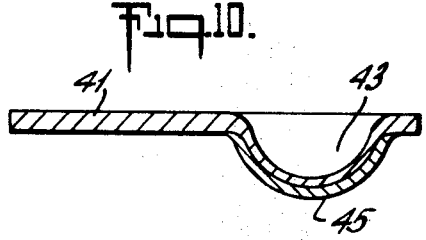
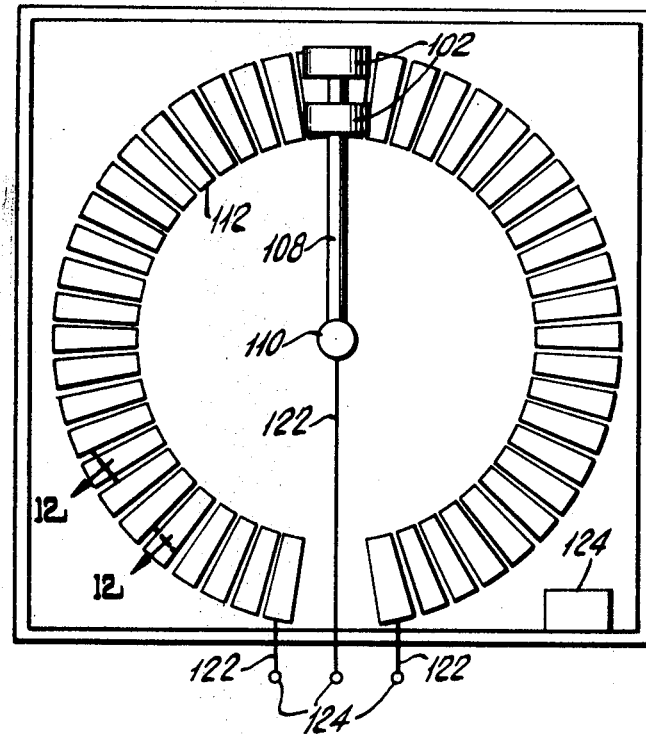
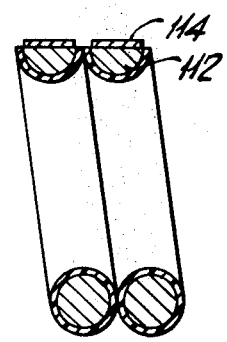
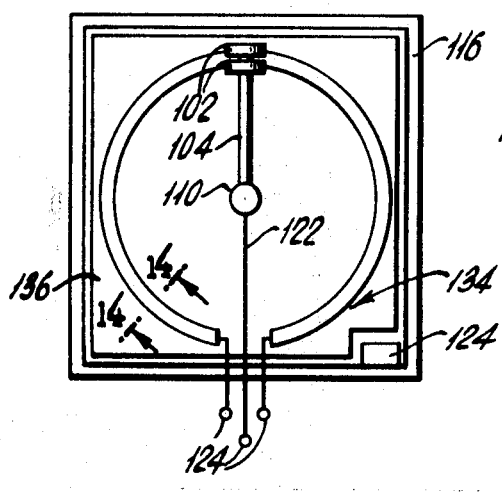
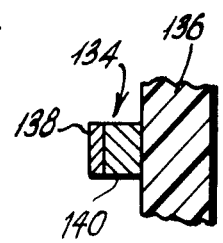
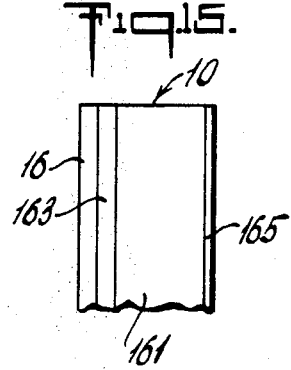
INVENTOR
JACK B. SPELLER
BY *Lawrence J. Marhoefer*
ATTORNEY Oct. 13, 1970  J. B. SPELLER  3,534,194
LOW NOISE ELECTRICAL CONTACT APPARATUS
Filed March 6, 1968  4 Sheets-Sheet 4
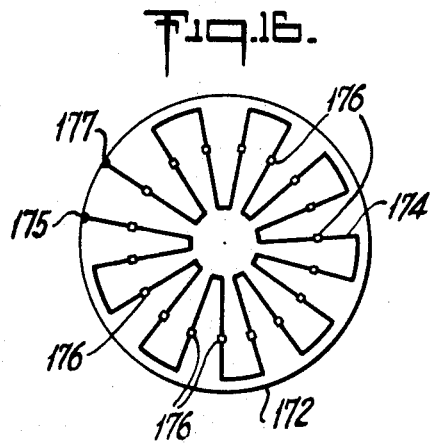
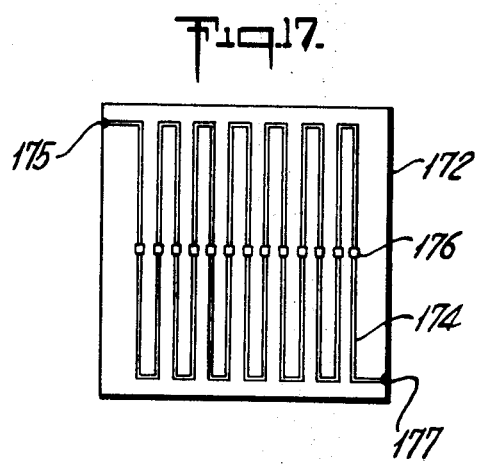
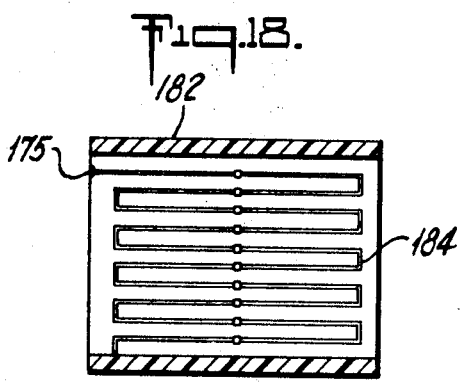
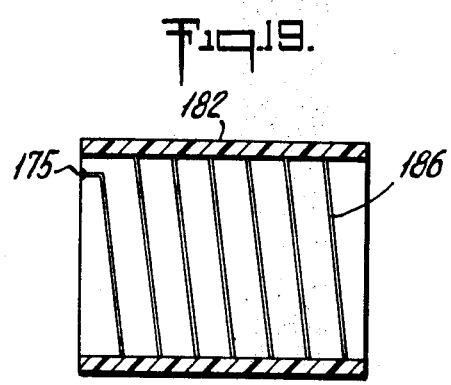
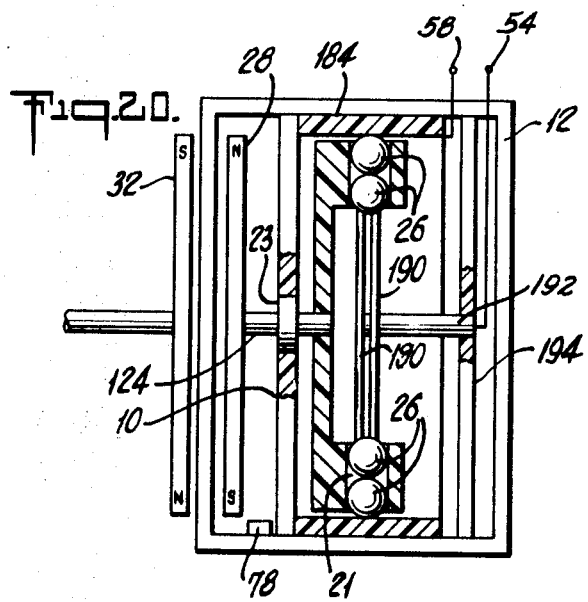
INVENTOR
JACK B. SPELLER
BY
Lawrence A. Marhoefer
ATTORNEY

United States Patent Office 3,534,194
Patented Oct. 13, 1970

3,534,194
LOW NOISE ELECTRICAL CONTACT APPARATUS
Jack B. Speller, 330 E. 46th St., New York, N.Y. 10017
Filed Mar. 6, 1968, Ser. No. 711,100
Int. Cl. H01h 1/16, 1/34
U.S. Cl. 200—166    23 Claims

ABSTRACT OF THE DISCLOSURE

A low-noise, electrical contact apparatus such as, for example, a potentiometer, an encoder, or the like employs a thin shell contact member which deflects at the point of contact and therefore reduces the stress in the contact member below the elastic limit of the member.

This invention relates to improvements in apparatus in which currents are conducted between relatively moving members and, more particularly, to an improved contact for such apparatus which has good contact resolution, long operating life, and low drag.

Shaft position encoders, potentiometers, choppers and other devices employing relatively moving contacts for conducting electric currents, have problems caused by the frictional forces developed between the contacts. For example, one problem, which affects most apparatus employing such contacts, is that they wear away, limiting the operating life of such devices. Other problems which particularly affect small, precision encoders are contact drag and poor signal to noise ratios. Still other problems are caused by deleterious deposits that build up on contacts.

Rolling balls have been proposed in the prior art as contacts in order to eliminate (or at least substantially reduce) the frictional forces developed. Such prior art rolling contacts have not been able to achieve this desired result and, in addition, they have not proved satisfactory because of problems springing chiefly from the extremely high stress developed in the region where the ball makes contact. Particularly in apparatus where the ball contacts are very small, metals that are most advantageous in terms of signal to noise ratio, contact resistance, and other factors (particularly, silver) are not able to withstand the stresses generated under even light contact pressures. Then, too, deleterious deposits tend to form on ball type contacts, as well as other contacts.

One object of this invention is, therefore, the provision of an improved moving contact for conducting electrical currents.

Another object of the invention is to provide an encoder, potentiometer, chopper or other similar apparatus that is economical to manufacture and which has a long operating life, low torque requirements, and a high signal to noise ratio.

A still further object and more specific of the invention is the provision of an electrical switching apparatus employing rolling silver contacts.

One more object of the invention is to provide a code disk having silver conducting regions on a glass base.

Additionally, it is an object of this invention to provide a simple, inexpensive coupling for driving a member sealed in a hermetic housing.

Yet, another object of this invention is the provision of a moving electrical contact that is lubricated and resists the formation of harmful coatings on the contacting surfaces.

Still other and further objects and features of the invention will appear in the following description.

Briefly, this invention contemplates an improved moving electrical contact where the apparent modulus of elasticity of the contact is less than the actual modulus of elasticity of the metal that comprises the contacting surface. A very thin metallic shell serves as the contact. The thickness of the shell is so selected that the shell deflects in the region of the point of contact, increasing the area of contact and, thereby, reducing the stress at that point below the yield point of the material from which the shell is made.

In one specific embodiment of the invention, thin spherical or cylindrical silver plated shells roll over a glass code disk with silver plated conducting regions. The unit is enclosed in a hermetic housing from which air has been expelled, preferably by the partial pressure of an inert gas, to prevent the formation of hydrogensulphide and other deleterious coatings on the silver contacts. In addition, an organic vapor atmosphere is provided within the housing. Such a vapor atmosphere has been found to form a lubricant at the points of contact.

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views in which:

FIG. 1 is a side elevation, with parts shown in section, of an encoder constructed in accordance with the teachings of this invention;

FIG. 2 is a view, with parts broken away, taken along the line of 2—2 of FIG.1;

FIG. 3 is a plan view of the spring which urges the spherical contacts against code disk in the encoder of FIG. 1;

FIGS. 4a and 4b are alternate embodiments of the spring of FIG. 3;

FIG. 5 is a cross section of one set of the spherical contacts of FIG. 1 on an enlarged scale;

FIG. 6 is a view similar to FIG. 5 showing an alternate embodiment of the spherical contacts;

FIG. 7 is an isometric view of a cylindrical or ring type rolling contact;

FIG. 8 is an isometric view of another embodiment of a thin shell rolling contact;

FIG. 9 is an isometric view of still another thin shell contact;

FIG. 10 is a sectional view taken along the line 10–10 of FIG. 9;

FIG. 11 is a plan view of a potentiometer constructed in accordance with this invention;

FIG. 12 is a sectional view taken along the line 12—12 of FIG. 11;

FIG. 13 is a plan view of another potentiometer constructed in accordance with this invention; and FIG. 14 is a sectional view taken along the line 14—14 of FIG. 13;

FIG. 15 is a sectional view of a code disk.

FIG. 16 is a plan view of a resistive pattern for a potentiometer constructed in accordance with the teachings of this invention;

FIG. 17 is a plan view of another resistive pattern for a potentiometer constructed in accordance with the teachings of this invention;

FIG. 18 is a cross sectional view of a cylinder showing a resistive pattern on its inner surface;

FIG. 19 is a cross sectional view of a cylinder showing a spiral resistive pattern on its inner surface;

FIG. 20 is a side elevation, with parts shown in section, of still another embodiment of a potentiometer or encoder constructed in accordance with the teachings of this invention.

Referring now to FIGS. 1 and 2 of the drawings, lugs 14 position a circular code disk 10 inside of a hermetic housing 12, which is conveniently formed of brass or aluminum or alternatively of an insulating material such as a ceramic. The lugs 14 may be affixed to the wall of the housing 12 by a cement or in another suitable manner known in the art.

Preferably, the code disk 10 is made of a rigid insulating material such as glass on one surface of which is formed a pattern of silver conducting segments 16 which alternate with non-conducting regions 18 of disk 10. Although any suitable code disk known in the art may be used, a glass disk with silver conducting segments is preferred because of the dimensional stability of the glass, the smoothness of its surface, and the advantageous electrical conducting properties of the silver. When the term silver is used throughout the specification and claims of this application, it will be understood to include silver alloys, such as copper-silver alloys for example. As will be appreciated by those skilled in the art, the thickness of the conducting segments 16 has been greatly exaggerated in the drawings for the purpose of clarity; these segments are typically less than one mil thick. It will also be appreciated that any desired pattern of conducting segments may be formed on the disk. A preferred method for constructing such a code disk will be described in detail later in this specification.

A contact carrier 22 is fixedly attached to a shaft 24 journaled in the disk 10 by means of a bearing 23. There are three equally spaced rectangular apertures 21 formed in the contact carrier 22, and each aperture carries two identical spheres 26 which serve as the moving contacts for the encoder. It should be noted that the combined diameters of two spheres 26 is greater than the thickness of the contact carrier 22 so that the spheres extend from both sides of the carrier.

On one side of the carrier 22 the spheres contact the surface of the code disk 10. In the embodiment of the invention shown, the three brushes are redundant in that they make and break contact with the conducting segments 16 simultaneously and are all coupled to a common slip ring, as is common practice in the encoder art in order to provide a reliable operation. The contact carrier 22 is preferably a rigid non-conducting material that provides a low coefficient of friction between it and the spheres 26 such as Teflon or sapphire.

The contact carrier 22 is rotated by a motor 36 (or other desired prime mover) via a magnetically coupled drive arrangement which consists of a permanent magnet 28 which is affixed to the shaft 24 inside the hermetic housing 12 and a similar permanent magnet 32 outside the housing 12. Magnet 32 is affixed to a shaft 24 driven by the motor 36. Owing to the magnetic coupling between magnets 28 and 32, rotation of magnet 32 produces a corresponding rotation of magnet 28 so that rotation of shaft 34 causes rotation of shaft 24.

Bearing against the spheres 26 on the other side of the contact carrier 22 is a silver ring 38 plated on the surface of the upper edge of a metallic compression spring 44 which maintains the spheres in contact with the ring 38 and the code disk 10. Lugs 48 affixed to the wall of the housing 12 support and position the spring 44.

Referring now to FIG. 3 in addition to FIGS. 1 and 2, the spring 44 is arranged in such a manner that it serves both to maintain the spherical contacts 26 in engagement with the disk 10 and to provide, in part, an electrical path between the silver ring 38 a terminal 54 outside the housing 12.

The spring 44 is constructed of any suitable electrically conductive material such as copper, and comprises a first ring 47 and a second concentric ring 49. The first ring 47 is attached to the second ring 49 by a plurality of short, small strips 53 spaced apart a predetermined distance from each other. The second ring 49, then, is attached to a body 51 by strips 55, similar to the strips 53, but spaced apart from each other at points intermediate the strips 53. The distance between the strips 53 and the distance between the strips 55 is calculated, having regard to the thickness and spring constant of the two rings 47 and 49, so that the resulting spring constant on the surface 38 is controlled and is substantially the same at any point around the ring 47.

A spring such as shown in FIG. 4a or 4b may be used in place of the spring 44, if desired, to provide a controlled and substantailly constant spring constant at all points around the periphery of a ring. In FIG. 4a the surface 38 is on a ring 59 which is supported from a rigid body 61 by a plurality of "lazy V" members 63. In the embodiment of FIG. 4b three flat coplanar rings are joined by tabs. It should be noted that each of the springs shown may be advantageously made by cutting or etching a cylinder in the embodiment of FIGS. 3 and 4a and a flat disk in the embodiment of FIG. 4b.

A lead 52 connects the slip ring 38 to the terminal 54 external to the housing 12, and a lead 56 connects the conductive members 16 on the code disk 10 to another external terminal 58. Thus, if a source of direct current potential is coupled between the terminals 54 and 58, the circuit is opened or closed once each time the disk 22 moves through an arc equal to the width of a segment on the code disk 10.

Referring now to FIG. 5, in the preferred embodiment of FIG. 1 each sphere 26 has a core of thermoplastic material 62 which supports a thin metallic shell. Acetate, ureic, and nylon type plastics are suitable. The shell may comprise, for example, a thin copper coating 64, which, in turn, is covered with a thin silver coating 66. In one exemplary, satisfactory embodiment of the invention, the spheres 26 are each about 0.08 inch in diameter, the copper shell is about 0.0002 inch thick, and the silver shell is about 0.0005 inch thick. The spheres deflect slightly at each point of contact; that is, between the sphere 26 and the code disk 10, between the spheres themselves and between the spheres 26 and the slip ring 38. It will be appreciated that for a given load on the spheres 26, the amount of deflection is principally a function of the thickness of the shell and its composition since the modulus of elasticity of the core 62 is relatively low. Thusly, for thin shells of a given material, the effective modulus of elasticity of the material can be controlled, in effect by selecting the thickness of the shell to the end that the stress developed at each contact point is below the elastic limit of the materials used to form the shell, the slip rings and the conductive regions of the code disk.

The use of silver contacts is potentially advantageous in terms of signal to noise ratio, contact resistance and the like, but certain chemicals in most atmospheres, such as sulphur for example, tend to form coatings which have a deleterious effect on the electrical conducting characteristics of silver contacts. It is to prevent the formation of such coatings that the housing 12 is hermetically sealed. Conveniently, the space 76 inside the hermetic housing 12 is filled with an inert gas such as helium. In addition, it has been found advantageous to provide a material inside the housing 12 to form a lubricant at the points of contact. Organic vapors have proved satisfactory for this purpose. Such compounds are believed to form lubricants having advantageous characteristics as a result of the pressures and friction at the points of contact. V M and P Naptha, available from Sealed Liquid Products, Inc., New York, N.Y., having a freezing point about minus 100 degrees Fahrenheit and an initial boiling point about plus 240 degrees Fahrenheit has been found to produce a satisfactory vapor. Acetylene, benzene, toluene, xylene, napthalene, cyclohexene, crotonaldehyde, butyraldehyde, are examples of other organic vapors that may be employed to form a lubricant. A small container of liquid naphtha 78 may be used to produce the vapor. Alternately, a sponge soaked with the naphtha may be provided for those applications where a liquid would spill. It should also be noted that the contacts may be immersed in a liquid lubricating forming material if desired.

In the preferred embodiment of FIG. 1 a pair of spheres comprises each contact; with this arrangement the tangential speed at the opposite, outermost points on the two spheres is the same. One sphere 26 is in rolling mechanical engagement with the surface of code disk 10 due to the rotation of the contact carrier 22. The surface 38, being stationary like the disk 10, causes the other sphere 26 to roll so that its peripheral speed matches the speed of the upper sphere 26. Thus, the contacts are substantially frictionless.

It should be noted that it is not necessary that the spheres 26 have a solid core. For example, it is satisfactory to employ a hollow sphere as shown in FIG. 6. In this embodiment, a thin inner spherical shell of beryllium copper 74 is plated with a thin outer layer of silver 76. It should also be noted that a thin shell comprised of a single metal may be used for certain applications. However, for most applications, thin shells of two or more metals are advantageous as each layer can contribute to the whole owing to the fact that each is quite thin. That is, the inner metallic layer may be selected for its mechanical properties and the outer layer for its electrical properties.

Furthermore, it will be appreciated that for some applications a cylindrical or ring type shell rather than a spherical shell may be advantageous. FIG. 7 shows such a cylindrical shell comprised of an inner copper cylinder 86 coated with a thin silver coating 88.

Referring now to FIG. 8, in this embodiment the rolling contact has a thin outer metallic ring 92 and a centrally disposed conducting shaft 94. Three thin metallic inner rings 96 provide radial support for the outer ring 92 and permit it to revolve freely about the inner shaft 94. Furthermore, these inner rings 96 provide a conductive path between the outer ring 92 and the central shaft 94. Cylinders of Teflon or other suitable low friction material (not shown) may be inserted between the rings 96 in order to maintain their relative spacing. As will be appreciated by those skilled in the art, suitable flanges or covers may be provided to prevent the inner rings 96 from moving axially with respect to the outer ring 92.

Referring now to FIGS. 9 and 10, in certain applications where a rolling contact is not required, such as a vibrating contact employed in a so-called electromechanical chopper, a thin hemispherical contact may be employed. In the embodiment shown, a flat copper strip 41 has a thin hemisphere 43 formed in it. The hemisphere 43 is preferably coated with a thin silver coating 45. If desired, the hemisphere 43 may be filled with a thermoplastic material or other similar material to strengthen it. As with the rolling contacts previously discussed, the hemisphere 34 is quite thin—on the order of .0002 to .007 inch thick for example—so that it deflects slightly at the point of contact, increasing the contact area and thereby decreasing the contact pressure. This results in markedly reduced wear although the contact area does not markedly increase. Advantageously, such contacts as shown in FIGS. 9 and 10 are also enclosed in a hermetic housing from which air has been excluded and into which an organic vapor is introduced in the manner described in connection with the encoder of FIG. 1, such a vapor, even in the case of vibrating contacts, is advantageous in that it tends to form a lubricant that prolongs the life of the contacts.

FIGS. 11 and 12 show a potentiometer employing rolling contacts of the type shown in FIG. 8. In this potentiometer, two redundant rolling contacts 102 are coupled to a conductive shaft 108 which rotates a central shaft 110. It will be appreciated that a handle, or motor, or other suitable device known in the art may be coupled to the central shaft 110 for moving the contacts. Conveniently, the contacts 102 ride on the surface of a helix of insulated wire 112 whose upper surface has been ground flat and covered with a thin coating of silver 114.

Preferably, the contacts 102 are coated with silver and the potentiometer is enclosed in a hermetic housing 116, similar to housing 12 of FIG. 1, in which the atmosphere consists of an inert gas and an organic vapor from a source 124. A magnet may be secured to the shaft 110 inside the housing and magnetically coupled to another magnet outside the housing for driving the arm 108 in the same fashion as FIG. 1. Leads 122 couple the coil 112 and the arm 108 to external terminals 124.

FIGS. 13 and 14 show an infinite resolution potentiometer constructed in accordance with the teachings of the invention. This potentiometer is in certain respects the same as the potentiometer of FIG. 11; like parts have been marked accordingly and the explanation of these parts will not be repeated. In this embodiment, however, a continuous conductive strip 134 is deposited on an insulating substrate 136. Preferably, the thin shell contacts 102 are silver coated. The conductive strip 134 may be a composite strip consisting of a layer of conductive material 140, selected to provide a certain resistance between the terminals 124, and a very thin silver coating 138. The conductive layer 140, for example, may be a copper nickel alloy selected for its low temperature coefficient. Alternatively, layer 140 may be a material having a negative temperature coefficient. It will be appreciated that the resistance of the entire strip 134 may be controlled by controlling its width and thickness.

In a preferred embodiment of the potentiometer of FIGS. 13 and 14, a glass substrate 136 is employed. A resistive strip having a low temperature coefficient may be formed on this substrate in the following manner.

First, a thin, narrow strip of a suitable metal is bonded to the substrate in the manner described more fully in connection with FIG. 15. For a Constantine resistance element (55% copper-45% nickel), first copper is electroplated onto the substrate metal strip, then nickel is electroplated on top of the copper. Thereafter, the disk is heated to form the copper-nickel alloy in situs. It will be appreciated that in electroplating, the quantities of deposited metal can be carefully controlled.

Refer now to FIG. 15. The code disk 10 advantageously comprises a glass base 161 on the upper surface of which the pattern of silver conducting regions 16 is formed in the following manner. A glass base is advantageous in that it is dimensionally stable and its surface can be made quite smooth and quite flat.

In preparing a code disk, a suitable metal, gold or platinum, for example, is first painted onto the surface of the base 161 in order to form a suitable surface onto which silver can be electroplated. Suitable solutions of gold and platinum for this purpose are available commercially from Engelhard Industries, East Newark, N.J. A coating from 3 to 10 microinches thick is satisfactory. Using platinum, for example, after painting, the disk is heated to about 1,000 degrees Fahrenheit in order to form a deposit of metallic platinum 163 on the surface of the glass. The surface on which the metal has been deposited is preferably painted with another coat of platinum and heated in the manner described above in order to fill any pin holes that may exist in the first coating.

After the coating 163 has been formed completely, a suitable masking resist known in the art is applied to the surface of the coating 163 in the pattern desired. The unmasked portions of the metallic coating 163 are then etched away with a suitable reagent such as aqua regia.

After etching, the resist is removed and the disk is then heated to a temperature which is approximately at the softening point of the glass base 161. For a borosilicate glass, for example, this temperature is approximately 1,200 degrees Fahrenheit. This heating step bonds the metal pattern firmly to the glass base 161.

Thereafter, the silver surface coating 16 may be electroplated onto the platinum layer 163 in a suitable manner known in the art. The thickness of the surface layer 16 is preferably between 25 and 30 millionths of an inch and may be plated in a single step if desired.

Advantageously, a layer of the substrate metal 165 (platinum in this example) is also formed on the opposite side of the glass disk 161 in order to prevent the disk from warping.

Rather than bond a metal substrate to the glass disk by heating, a suitable substrate for electroplating can be formed by depositing a layer of chrome or nickel by means of ionic bombardment techniques known in the art. With a chrome substrate, it will be appreciated that it is advantageous to first electroplate a layer of Watts nickel on top of the chrome substrate and then electroplate the silver on top of the Watts nickel. In addition, smooth, insulating bases other than glass may be used in forming the conductive patterns for a code disk and the resistive patterns for potentiometers.

Referring now to FIG. 16, a potentiometer disk 172, which may be used in the potentiometers of FIG. 11 or 13 if desired, has a resistance element 174 formed on its surface in a generally serpentine pattern, which provides a relatively large resistance between terminals 176 and 177 in a relatively small space. The resistance element 174 may be plated with silver in the small regions indicated at 176, which is the path that the potentiometer contact will follow. It will be appreciated that the resistance element of this embodiment and also the embodiments of FIGS. 17 to 19 can be formed by using the techniques previously explained.

FIG. 17 shows a potentiometer plate similar to that of FIG. 16 except that this embodiment is for use with potentiometer contact that has a linear motion.

FIG. 18 shows a cylindrical potentiometer element 182 which has a resistance element 184 formed on its inner surface. The pattern of element 184 is similar to the pattern of FIG. 17. In forming a pattern on the inside surface, a suitable substrate metal such as gold or platinum is first formed, as previously explained. A photosensitive resist may be applied in the desired pattern by means of flexible mask on which the desired pattern can by drawn while mask is flat. It may then be rolled into a cylinder and placed inside the cylinder 182. The resist pattern may be exposed by illuminating the interior of the cylinder in a suitable manner. It will be understood that if desired the pattern may be formed on the outer surface of a cylinder in a similar manner.

It should be noted that while the resistance patterns of FIGS. 16 to 18 have been shown as relatively open for clarity, the patterns in practice are usually relatively close so that the contact element is in continuous contact with the resistance element.

FIG. 19 shows another cylindrical potentiometer element similar to that of FIG. 18. In this embodiment, a resistance element 186 is a spiral and may be used in combination with a contact that both rotates and moves longitudinal in order to form an infinite resolution potentiometer.

It should be noted that cylindrical code elements similar to those shown in FIGS. 18 and 19 may be made for rotary encoders by merely forming a suitable conductive pattern on the inner surface of the cylinder.

FIG. 20 shows a typical construction for either a potentiometer or encoder employing a cylindrical element 184. The unit of FIG. 20 is a hermetically sealed unit with a benzene and inert gas atmosphere similar to that of FIG. 1 and like reference numerals have been used to indicate the parts that are functionally the same so that a detailed explanation of this embodiment is deemed unnecessary. It should be noted that in this embodiment a pair of slip rings 190 are affixed to a conductive shaft 192 which is supported by an insulating plate 194. The slip rings 190 are preferably springs with a uniform spring constant around their periphery. The springs shown in FIG. 4b may be used.

It will be understood that certain features and subcombinations are of utility and may be employed without reference to other features and subcombinations. For example, the potentiometer embodiments of FIGS. 11 and 13, may use a pair of sphere type contacts such as that shown in the encoder embodiment FIG. 1, or could use a contact of the type shown in FIGS. 10 and 11. Similarly, the operating characteristics of encoders, potentiometers, choppers, and other switching devices of the type known in the prior art may be improved by enclosing such devices in hermetically sealed housing from which air has been excluded and organic vapor has been introduced. This is particuarly advantageous for those prior art devices employing silver contacts. In addition, a system of rolling contacts of a material other than silver may be employed. Such a system may employ a pair of gold spheres without lubricant, for example. Such spheres need not be thin-shelled spheres, and, although they would not have the long-life, low-noise characteristics of the preferred embodiments of the invention, they may be satisfactory for certain applications.

It is further obvious that various changes may be made in details within the scope of the claims without departing from the spirit of the invention. It is, therefore, to be understood that this invention is not to be limited to the specific details shown and described.

What is claimed is:

1. In an electric current conducting apparatus the combination comprising:
   two electric current conducting members, at least one of which has a curved surface,
   means operatively coupled to at least one of said conducting members to move said conducting members relatively to one another in order to bring said curved surface of one of said conducting members into contact with the other of said conducting members, and
   means operatively coupled to at least one of said conducting members urging said conducting members together when said conducting members are in contact with one another with a force that deflects at least one of said conducting members at the point of contact so that the stress on said conducting members at the point of contact is below their elastic limit.

2. In an electric current conducting apparatus as in claim 1 wherein said conducting member having a curved surface is a thin ring.

3. In an electric current conducting apparatus as in claim 1 wherein said conducting member having a curved surface is a thin spherical shell.

4. In an electric current conducting apparatus as in claim 3 wherein said thin shell conducting member comprises an inner thin shell of one metal and an outer thin shell of silver.

5. In an electric current conducting apparatus as in claim 1 wherein said curved surface of said conducting member is silver.

6. In an electric current conducting apparatus as in claim 5 including a hermetic housing enclosing said conducting members and an organic vapor within said housing for lubricating said conducting members.

7. In an electric current conducting apparatus, the combination comprising:
   a first electric current conducting member,
   a second electric current conducting member,
   a round contact means,
   means operatively coupled to said round contact means for supporting said round contact means in contact with said first and second current conducting members to provide a current conducting path between said first and second current conducting members,
   said supporting means supporting said round contact means so that it rolls on said first current conducting member as it moves with respect thereto,
   means operatively coupled to said round contact means for urging said round contact against said first current conducting member with a force that deflects said round contact means at the point of contact so that said round contact means is stressed below its elastic limit, and means operatively connected to said round contact for rolling said contact along a path relative to at least said first current conducting member.

8. In an electric current conducting apparatus as in claim 7 wherein said round contact means includes a pair of thin shell spheres which roll with respect to one another and with respect to both said first and second current conducting members.

9. In an electric current conducting apparatus as in claim 7 wherein said round contact means includes a thin-shell ring.

10. In an electric current conducting apparatus as in claim 8 wherein said spheres each have a silver surface.

11. In an electric current conducting apparatus as in claim 9 wherein said thin-shell ring has a noble metal surface.

12. In an electric current conducting apparatus as in claim 8 wherein said thin shells each comprise an inner shell of one metal and an outer shell of another metal.

13. In an electric current conducting apparatus as in claim 12 wherein said outer shell is silver.

14. In an electric current conducting apparatus as in claim 13 further including a hermetic housing and a lubricating means including an organic vapor that forms a lubricant in situs between said round contact means and said first current conducting member.

15. In an electric current conducting apparatus as in claim 7 wherein said first current conducting member includes a pattern of silver conducting regions on a glass base.

16. In an electric current conducting apparatus as in claim 7 wherein said first current conducting member has a relatively high resistivity as compared to silver.

17. In an electric current conducting apparatus as in claim 16 wherein said first current conducting member is a helical coil, said coil having a silver coating along the path where said round contact means moves in contact with said first current conducting member.

18. In an electric current conducting apparatus as in claim 14 wherein said first current conducting member includes a conducting pattern on an insulating base and further includes a spring for applying a uniform pressure on said spheres as spheres move along said path.

19. In an electric current conducting apparatus as in claim 18 wherein said means for moving said spheres includes a low-friction mean for constraining said spheres to move along said path.

20. In an electric current conducting apparatus as in claim 19 wherein said low-friction means contacts said spheres at their axes of rotation.

21. In an electric current conducting apparatus as in claim 19 wherein said means for moving includes a first magnet disposed inside said housing and a second magnet disposed outside said housing, said magnets being magnetically coupled to one another whereby movement of said second magnet results in movement of said first magnet.

22. In an electric current conducting apparatus as in claim 7 wherein said round contact means includes a plurality of rings in rolling contact with said first and second current conducting members.

23. In an electric current conducting apparatus as in claim 7 wherein said round contact means includes an outer conductive cylinder contacting an inner conductive cylinder, said outer cylinder in rolling contact with said first current conducting member, said inner cylinder disposed within said outer cylinder and in rolling contact with said outer cylinder and said second conducting member.

References Cited
UNITED STATES PATENTS

| | | | |
|---|---|---|---|
| 2,135,809 | 11/1938 | Fruth | 338—157 |
| 2,595,189 | 4/1952 | Dewan | 338—157 X |
| 2,694,127 | 11/1954 | Fearn | 338—157 X |
| 2,796,487 | 6/1957 | Dehn. | |
| 3,024,334 | 3/1962 | Rhodes. | |
| 3,113,196 | 12/1963 | Spooner et al. | |
| 3,164,708 | 1/1965 | Theobald. | |
| 3,222,489 | 12/1965 | Chaikin. | |
| 3,278,715 | 10/1966 | Arbonies. | |
| 3,436,605 | 4/1969 | Landron | 175—68.5 X |

HERMAN O. JONES, Primary Examiner

U.S. Cl. X.R.

338—157